US012793231B2

(12) United States Patent
Regensburger

(10) Patent No.: US 12,793,231 B2
(45) Date of Patent: Nov. 10, 2026

(54) GENERATING A TEMPORARY IMAGE

(71) Applicant: Siemens Healthcare GmbH, Erlangen (DE)

(72) Inventor: Alois Regensburger, Poxdorf (DE)

(73) Assignee: Siemens Healthineers AG, Forchheim (DE)

( * ) Notice: Subject to any disclaimer, the term of this patent is extended or adjusted under 35 U.S.C. 154(b) by 1033 days.

(21) Appl. No.: 17/941,917

(22) Filed: Sep. 9, 2022

(65) Prior Publication Data

US 2023/0083134 A1 Mar. 16, 2023

(30) Foreign Application Priority Data

Sep. 16, 2021 (DE) ..................... 10 2021 210 283.2

(51) Int. Cl.

*G06T 11/00* (2026.01)
*G06T 7/20* (2017.01)
*G06T 12/30* (2026.01)

(52) U.S. Cl.

CPC ................ *G06T 7/20* (2013.01); *G06T 12/30* (2026.01); *G06T 2207/20081* (2013.01); *G06T 2207/30004* (2013.01); *G06T 2210/41* (2013.01)

(58) Field of Classification Search

CPC ......... G06T 11/008; G06T 2207/10016; G06T 2207/10081; G06T 2207/10088; G06T 2207/10104; G06T 2207/10116; G06T 2207/10121; G06T 2207/20076; G06T 2207/20081; G06T 2207/20084;

(Continued)

(56) References Cited

U.S. PATENT DOCUMENTS

2007/0031017 A1 2/2007 Gundel
2014/0355844 A1* 12/2014 Menini ..................... G06T 7/20 382/121

(Continued)

FOREIGN PATENT DOCUMENTS

DE 102005036999 A1 2/2007

OTHER PUBLICATIONS

Chen, Guang-Hong, Jie Tang, and Jiang Hsieh. "Temporal resolution improvement using PICCS in MDCT cardiac imaging." Medical physics 36.6Part1 (2009): 2130-2135.

(Continued)

*Primary Examiner* — Michael J Vanchy, Jr.

(74) *Attorney, Agent, or Firm* — Lempia Summerfield Katz LLC

(57) ABSTRACT

A method for generating a temporary image includes acquiring first data of an examination object, and providing at least one initialization image by applying a first processing function and/or a second processing function to the first data. The first processing function and the second processing function are at least partially different. The at least one initialization image is visualized. Further data of the examination object is acquired. Result data is provided by applying the first processing function to the further data. A result image is provided by applying the second processing function to the further data and/or the result data. The result data is provided before the result image. The temporary image is generated based on the result data and the at least one initialization image. The temporary image is visualized, and the result image is visualized.

19 Claims, 6 Drawing Sheets

(58) Field of Classification Search
CPC . G06T 2207/20216; G06T 2207/30004; G06T 2210/41; G06T 7/0012; G06T 7/20; G06T 12/30
See application file for complete search history.

(56) References Cited

U.S. PATENT DOCUMENTS

| | | | | |
|---|---|---|---|---|
| 2018/0253822 | A1 | 9/2018 | Maack et al. | |
| 2020/0051210 | A1* | 2/2020 | Wang | G06T 3/4015 |
| 2020/0126191 | A1* | 4/2020 | Munkberg | G06T 5/70 |
| 2021/0137634 | A1* | 5/2021 | Lang | A61B 90/00 |

OTHER PUBLICATIONS

Guo, Yuyu, Lei Bi, Euijoon Ahn, Dagan Feng, Qian Wang, and Jinman Kim. "A spatiotemporal volumetric interpolation network for 4d dynamic medical image." In Proceedings of the IEEE/CVF Conference on Computer Vision and Pattern Recognition, pp. 4726-4735. 2020.

* cited by examiner

GENERATING A TEMPORARY IMAGE

This application claims the benefit of German Patent Application No. DE 10 2021 210 283.2, filed on Sep. 16, 2021, which is hereby incorporated by reference in its entirety.

BACKGROUND

The present embodiments relate to generating a temporary image.

With, for example, intraoperative and/or interventional imaging of an examination object, a plurality of mappings (e.g., a video sequence) of the examination object is frequently acquired in chronological order by a medical imaging device. A change in an examination region of the examination object (e.g., a change over time and/or a spatial one) may be observed in real time by a medical operator (e.g., a female or male doctor) by visualization of a graphical representation of the plurality of mappings (e.g., the video sequence). X-ray fluoroscopy is one example of such real-time imaging. The examination region may be mapped with repeated radioscopy on a detector. In X-ray fluoroscopy, a low frame rate is often chosen in order to reduce an X-ray dose. The low frame rate may lead to flickering of the graphical representation of the mappings of the examination region visualized in real time. The visual impression of the video sequence is frequently not fluid as a result.

In addition, a low-latency visualization of the graphical representation of the mappings of the examination region may be advantageous for reliable monitoring of the change in the examination region (e.g., a movement).

For a more fluid visual impression there are (e.g., in television engineering) methods for calculating temporary images between two successive images of a video sequence. Since this calculation of the temporary images presupposes knowledge of the next image in each case of the video sequence, however, this would delay visualization of the graphical representation of the respectively current mapping of the examination region by half an image acquisition period, whereby observation of the change in the examination region in real time may be adversely hindered.

SUMMARY AND DESCRIPTION

The scope of the present invention is defined solely by the appended claims and is not affected to any degree by the statements within this summary.

The present embodiments may obviate one or more of the drawbacks or limitations in the related art. For example, low-latency processing and visualization of graphical representations of mapping data of an examination object are enabled.

The present embodiments relate, in a first aspect, to a method (e.g., a computer-implemented method) for generating a temporary image. In a first act a), first data of an examination object is acquired by a medical imaging device. Further, in a second act b), at least one initialization image is provided by applying a first processing function and/or a second processing function to the first data. The first processing function and the second processing function are at least partially different. In a third act c), a graphical representation of the at least one initialization image is visualized. In a fourth act d), further data of the examination object is acquired by the medical imaging device (e.g., after the acquisition of the first data). In one embodiment, the first data and the further data map an at least partially shared examination region of the examination object. In a fifth act e.1), result data is provided by applying the first processing function to the further data. In addition, in a sixth act e.2), a result image is provided by applying the second processing function to the further data and/or the result data. The result data is provided before the result image. In a seventh act f), the temporary image is generated based on the result data and the at least one initialization image. Further, in an eighth act g), a graphical representation of the temporary image is visualized. In a ninth act h), a graphical representation of the result image is visualized. Acts d) to h) are repeated until the occurrence of a termination condition. Further, at least acts c), g), and h) are successively carried out. The result data and/or the result image is provided during the repeated execution of acts d) to h) as the at least one initialization image.

In one embodiment, acts a) to h) may be executed at least partially successively. In addition, acts a) to h) may be at least partially (e.g., completely) computer-implemented.

The medical imaging device for acquiring the first data and the further data may be configured, for example, as a magnetic resonance tomography system (MRT) and/or computed tomography system (CT) and/or medical X-ray device and/or positron emission tomography system (PET) and/or ultrasound device and/or optical imaging device (e.g., as a laparoscope). In one embodiment, the first data and the further data of the examination object are acquired successively (e.g., sequentially) by the medical imaging device.

The first data and the further data may map the examination object in each case at least in certain sections (e.g., completely). In one embodiment, the first data and the further data may map at least one partially (e.g., completely) shared examination region of the examination object. The examination region may describe a spatial section of the examination object, which includes, for example, partially or completely, an anatomical structure (e.g., an organ and/or a tissue). The examination object may be, for example, a human and/or animal patient and/or an examination phantom.

The first data and/or the further data may have mapping data (e.g., image data and/or raw data) that maps the examination object (e.g., the at least partially shared examination region) in a two-dimensionally (2D) and/or three-dimensionally (3D) spatially resolved manner. For example, the first data and/or the further data may in each case have one or more single images that have at least partially different mapping geometries (e.g., mapping directions and/or mapping positions and/or mapping regions) and/or that map at least partially different sections of the examination object. In one embodiment, the first data and the further data may be acquired by the medical imaging device with substantially identical acquisition parameters (e.g., an acquisition rate and/or an X-ray dose and/or a field of view and/or a resolution). Further, the first data and/or the further data may in each case have a plurality of data points (e.g., image points) with data values (e.g., image values) that map the at least partially shared examination region. Further, the first data may have first metadata, where the first metadata may include, for example, an item of information relating to an acquisition parameter and/or operating parameter and/or positioning parameter of the medical imaging device during acquisition of the first data. Analogously, the further data may have further metadata, with it being possible for the further metadata to include, for example, an item of information relating to an acquisition parameter and/or operating parameter and/or positioning parameter of the medical imaging device during acquisition of the further data.

The first data may map the examination object (e.g., the at least partially shared examination region) at an initial instant. Further, the further data may map the examination object (e.g., the at least partially shared examination region) at a further instant after the initial instant.

The first processing function and/or the second processing function may be applied to the first data as input data and the at least one initialization image provided as output data. If only the first processing function or only the second processing function is applied to the first data as input data, an initialization image may be provided as output data. If the first processing function and the second processing function are applied to the first data as input data, in each case, an initialization image (e.g., a first initialization image and a second initialization image) may be provided as output data. Alternatively or in addition, the second processing function can be applied to the output data of the first processing function when applied to the first data and provide the at least one initialization image as output data.

Further, the first processing function may be applied to the further data as input data and provide the result data as output data. In addition, the second processing function may be applied to the further data and/or the result data as input data and provide the result image as output data after the result data. If the second processing function is applied only to the further data as input data, acts e.1) and e.2) may be executed so as to begin simultaneously. Alternatively, act e.2) may be executed after provision of the result data in act e.1). The first processing function and the second processing function are at least partially (e.g., completely) different. For example, with identical input data (e.g., the first data and/or the further data), the provisioning durations (e.g., the latencies) of the first processing function and the second processing function for providing the respective output data may differ. When applying the second processing function to the result data, the provisioning duration of the second processing function for providing the result image may include the provisioning duration of the first processing function for providing the result data.

The at least one initialization image may have a 2D or 3D spatially resolved mapping and/or a virtual representation (e.g., a model) of the examination object (e.g., of the at least partially shared examination region). The at least one initialization image may map and/or model the examination object (e.g., the at least partially shared examination region) at the initial instant. In one embodiment, the at least one initialization image may be generated from the first data by applying the first processing function and/or the second processing function. For example, the at least one initialization image may be reconstructed by applying the first processing function and/or the second processing function to the first data. Alternatively or in addition, the initialization image may be provided as a result of a filtering, an artifact reduction, and/or a movement correction by applying the first processing function and/or the second processing function to the first data. The at least one initialization image may, for example, have all features and properties that were described in relation to the first data.

In accordance with a first variant, the result data and the result image may in each case have a 2D or 3D spatially resolved mapping and/or a virtual representation (e.g., a model) of the examination object (e.g., of the at least partially shared examination region). The result data and the result image may map and/or model the examination object (e.g., the at least partially shared examination region) at the further instant. In one embodiment, the result data may be generated from the further data by applying the first processing function. Further, the result image may be generated from the further data and/or the result data by applying the second processing function. The result data and the result image may have at least partially identical or different geometric parameters (e.g., a spatial resolution and/or dimensionality and/or image value dynamics). The result data and the result image may have a different image quality. For example, the result image may have higher image quality with respect to the result data. Further, the result data may predominantly map high-contrast objects (e.g., corners, edges, tissue boundaries, medical objects, and/or marker objects) and substantially no low-contrast objects (e.g., tissue) of the examination object. In addition, the result image may map the high-contrast objects and the low-contrast objects of the examination object. In one embodiment, the result data and the result image may map the high-contrast objects with a substantially same level of detail.

The result data may be reconstructed by applying the first processing function to the further data. Further, the result image may be reconstructed by applying the second processing function to the further data and/or the result data. Alternatively or in addition, the result data may be provided as a result of a filtering, an artifact reduction, and/or a movement correction by applying the first processing function to the further data. In addition, the result image may be provided as a result of a filtering, an artifact reduction, and/or a movement correction by applying the second processing function to the further data and/or the result data. The result data and the result image may thus have, for example, all features and properties that were described in relation to the further data. In one embodiment, the result data and/or the result image may be registered with the at least one initialization image.

In accordance with a second variant, the result data may have spatial positionings (e.g., positions and/or orientations) and/or changes in position (e.g., changes in positions and/or orientations) in anatomical and/or geometric features (e.g., the high-contrast objects) of the examination object (e.g., of the at least partially shared examination region) at the further instant. For this, the anatomical and/or geometric features of the examination object (e.g., the high-contrast objects) may be identified (e.g., segmented and/or localized) by applying the first processing function to the further data. Further, the input data of the first processing function may also include the at least one initialization image, with a change in position of the anatomical and/or geometric features of the examination object that are mapped in the at least one initialization image and the further data being identified.

In act f), the temporary image is generated based on the result data and the at least one initialization image. In one embodiment, act f) may be executed immediately after providing the result data (e.g., before providing the result image). Further, the temporary image may be generated before providing the result image. The temporary image may have a 2D or 3D spatially resolved mapping and/or a virtual representation (e.g., a model) of the examination object (e.g., of the at least partially shared examination region). In one embodiment, the temporary image may have portions of the at least one initialization image and the result data. For example, the temporary image having the high-contrast objects mapped in the result data and the low-contrast objects mapped in the at least one initialization image may be generated.

In accordance with the first variant, the at least one initialization image and the result data may in each case have a plurality of image points with image values that spatially mutually correspond. Further, the temporary image may have a plurality of image points with image values. The image values of the image points of the temporary image are determined at least partially (e.g., completely) based on the image values of spatially mutually corresponding image points of the at least one initialization image and/or the result data.

In accordance with the second variant, the at least one initialization image may map anatomical and/or geometric features of the examination object (e.g., of the at least partially shared examination region) at the initial instant, with the result data having the spatial positionings and/or changes in position of the anatomical and/or geometric features at the further instant. Generating the temporary image may include a transformation (e.g., translation and/or rotation and/or scaling and/or deformation) of the mappings of the anatomical and/or geometric features (e.g., of the high-contrast objects) in the at least one initialization image based on the spatial positionings and/or changes in position of the anatomical and/or geometric features, incorporated by the result data, at the further instant.

In one embodiment, the temporary image may map and/or model the examination object (e.g., the at least partially shared examination region) at the further instant or at an instant between the initial instant and the further instant.

Providing the at least one initialization image, generating the temporary image, and providing the result image may in each case include a transfer to the presentation apparatus (e.g., a transfer in each case of a graphical representation of the at least one initialization image, the temporary image, and the result image to the presentation apparatus). The graphical representations may be adjusted to at least one operating parameter of the presentation apparatus.

The presentation apparatus may include a monitor and/or screen and/or projector that is configured for (e.g., sequential) visualization of the graphical representations of the at least one initialization image, the temporary image, and the result image. In one embodiment, the graphical representations of the at least one initialization images, the temporary image, and the result image may be visualized 2D or 3D in a spatially resolved manner (e.g., stereoscopically) using the presentation apparatus. In one embodiment, the graphical representations of the at least one initialization image, the temporary image, and the result image may be visualized by the presentation apparatus in (e.g., direct) chronological order (e.g., immediately after their respective provision and/or generation).

Acts d) to h) are executed repeatedly until the occurrence of a termination condition. The termination condition may provide a maximum number of repetitions of acts d) to h) and/or a maximum duration for the repeated execution of acts d) to h). Alternatively or in addition, the termination condition may be provided by an input by a medical operator using an input unit and/or by an acquisition protocol for acquisition of the first data and the further data. During the repeated execution of acts d) to h), the result data and/or the result image is provided as the at least one initialization image. During the repeated execution of acts d) to h), the temporary image may thus be generated based on the result data of the current repetition and the result data and/or the result image of the preceding repetition.

The generation of the temporary image based on the at least one initialization image and the result data, and the visualization of the graphical representation of the temporary image time-wise between the visualization of the graphical representations of the at least one initialization image and the result image may minimize a latency after acquisition of the further data.

In a further embodiment of the method, the result data may be provided by applying the first processing function to the further data in a first provisioning duration. The first provisioning duration is shorter than a second provisioning duration of the second processing function for providing the result image.

The first provisioning duration may include a first period (e.g., a first latency) that begins with applying the first processing function to the further data as input data and ends with providing the result data as output data. Analogously, the second provisioning duration may include a second period (e.g., a second latency) that begins with applying the second processing function to the further data and ends with providing the result image as output data. If the second processing function is applied (e.g., additionally) to the result data, the second provisioning duration may include the first provisioning duration for providing the result data. The first period may be shorter than the second period. By applying the first processing function to the further data, the result data may thus be provided more quickly than the result image by applying the second processing function to the further data and/or the result data.

In one embodiment, the first processing function and the second processing function are at least partially (e.g., completely) different. For example, with identical input data (e.g., the first data and/or the further data), the first processing function may provide the output data (e.g., the first initialization image and/or the result data) with a lower image quality (e.g., spatial resolution and/or dimensionality and/or image value dynamics) than the second processing function.

This may provide that the result data is provided before the result image. In one embodiment, the second provisioning duration may be longer than the sum of the first provisioning duration and a generation duration of the temporary image, with the generation duration of the temporary image including the complete execution of act f).

In a further embodiment of the method, the at least one initialization image may map the examination object at an initial instant. Further, the result data may map the examination object at a further instant after the initial instant. In addition, the temporary image may be generated in act f) such that the temporary image maps the examination object at the further instant or at an instant (e.g., an intermediate instant) between the initial instant and the further instant.

When acts a) to h) are executed for the first time, the output data of the first processing function and/or the second processing function may be provided as the at least one initialization image when the functions are applied to the first data. The at least one initialization image may map the examination object at a first instant as the initial instant. In other words, when acts a) to h) are executed for the first time, the initial instant may correspond to the first instant. With repeated execution of acts d) to h), the result data and/or the result image is/are provided as the at least one initialization image. The initialization image present in the current repetition of acts d) to h) may thus map the examination object at the further instant of the respectively preceding repetition as the initial instant. In other words, the initial instant on repeated execution of acts d) to h) may correspond to the further instant of the preceding repetition.

Further, the result data may map the examination object at the further instant after the initial instant (e.g., after the first instant or the further instant of the preceding repetition of acts d) to h)).

In one embodiment, the temporary image in act f) may be generated based on the result data and the at least one initialization image such that the temporary image maps the examination object at the further instant or at an instant between the initial instant and the further instant. A latency-minimized visualization of the graphical representation of the temporary image may be achieved hereby.

In a further embodiment of the method, the result data may map a change in the examination object with respect to the at least one initialization image. Further, in act f), a movement model characterizing the change may be determined using the at least one initialization image. Alternatively, the movement model characterizing the change may be determined using the at least one initialization image and the result data. In addition, the temporary image may be generated additionally based on the movement model such that the temporary image maps the change at the further instant or at the instant (e.g., the intermediate instant) between the initial instant and the further instant.

The change in the examination object may include, for example, a movement (e.g., a physiological movement) of at least part of the examination object (e.g., an organ movement) and/or a movement of a medical object (e.g., a diagnostic and/or surgical instrument and/or an implant) in the examination object and/or a flow of contrast agent (e.g., a contrast agent bolus) in the examination object. The change may include, for example, a uniform, a non-uniform, a periodic, or a non-periodic movement in the examination object.

The movement model may include a virtual representation (e.g., a volume model, such as a volume net model) and/or a skeleton model of at least a part of the examination object (e.g., of the entire examination object). Further, the movement model may be deformable. Alternatively or in addition, the movement model may include a virtual representation of the medical object and/or of the flow of contrast agent (e.g., computational fluid dynamics (CFD)). In one embodiment, the movement model may map the change (e.g., the movement in the examination object) between the initial instant and the further instant. The movement model may map at least one degree of freedom of movement and/or a speed of movement and/or a direction of movement and/or a periodicity of the change.

In one embodiment, the at least one initialization image may provide an initial state of the movement model for the initial instant. The initial state may be determined in the at least one initialization image, for example, by segmenting a mapping of an anatomical object (e.g., an organ and/or tissue) and/or a geometric object (e.g., a contour) and/or a medical object (e.g., a surgical and/or diagnostic instrument, such as a catheter) and/or an implant. The movement model may receive the at least one initialization image as input data. Further, the movement model may provide a simulated (e.g., extrapolated) state (e.g., a simulated image) for a provided instant (e.g., the further instant or the instant between the initial instant and the further instant) as output data. The simulation (e.g., the extrapolation) of the simulated state may take place in the examination object, assuming, for example, a uniformity or periodicity of the change (e.g., of the movement).

In one embodiment, the result data may map the change over time and/or spatial change in the examination object with respect to the at least one initialization image (e.g., with respect to the initial instant). Further, the result data may provide a second state of the movement model for the further instant. The second state may be determined in the result data by segmenting a mapping of an anatomical object and/or a geometric object and/or a medical object. Alternatively, the second state may be determined using the spatial positionings and/or changes in position in the anatomical and/or geometric features of the examination object, incorporated by the result data, at the further instant.

A state of the movement model simulated (e.g., extrapolated) for the further instant may be compared with the second state in order to generate the temporary image. If the comparison results in a deviation between the simulated state and the second state, which lies below a provided threshold value, the assumption of uniformity or periodicity of the change (e.g., of the movement) underlying the simulation (e.g., extrapolation) may be confirmed. In this case, the temporary image may be generated based on the at least one initialization image and the simulated state of the movement model. Otherwise, the temporary image may be generated based on the result data and the at least one initialization image.

In one embodiment, the input data of the movement model may also include the result data. Determining the movement model using the at least one initialization image and the result data may include a comparison between a state of the movement model simulated for the further instant and the second state provided by the result data. Further, at least one parameter of the movement model may be adjusted such that a deviation between the state of the movement model simulated for the further instant and the second state provided by the result data is minimized. The movement model may hereby be adjusted to the change in the examination object mapped by the at least one initialization image and the result data. In one embodiment, the temporary image may also be generated based on the movement model (e.g., based on the simulated state). The temporary image may hereby map the state of the change particularly precisely (e.g., also at an instant between the initial instant and the further instant). For example, the movement model may include determining at least one movement vector of the change (e.g., of the movement in the examination object). For example, the movement model may describe the movement (e.g., the at least one movement vector) of the anatomical object and/or of the geometric object and/or of the medical object in the examination object between the initial instant and the further instant.

In a further embodiment of the method, acts d) to h) may be repeated at least once. The movement model may be determined using the previous initialization images and the respectively current result data.

In one embodiment, the movement model may receive the at least one initialization image of the at least one preceding execution of acts d) to h) and the at least one initialization image of the current (e.g., instantaneous) execution of acts d) to h) as input data. The plurality of initialization images may respectively provide a state of the movement model at the respective initial instant. The simulation (e.g., the extrapolation) of the simulated state of the movement model and/or the adjustment of the at least one parameter of the movement model may be improved hereby.

The temporary image, which is generated additionally based on the movement model, may map the change at the further instant or at the instant between the initial instant and the further instant particularly precisely by taking into account the previous initialization images and the respectively current result data when determining the movement model.

In a further embodiment of the method, a movement signal may be received. The movement signal describes (e.g., maps) a physiological movement of the examination object and/or a movement of a medical object in the examination object. The movement model may additionally be determined using the movement signal.

Receiving the movement signal may, for example, include capturing and/or reading out a computer-readable data memory and/or receiving from a data memory unit (e.g., a database). Further, the movement signal may be provided by a provisioning unit of a physiological sensor (e.g., an electrocardiograph (ECG) and/or a respiratory sensor and/or a pulse sensor and/or a movement sensor) and/or a sensor for detecting a positioning of the medical object (e.g., an electromagnetic and/or optical and/or acoustic and/or mechanical sensor).

In one embodiment, the movement model may additionally be determined using the movement signal (e.g., the at least one parameter of the movement model may additionally be adjusted using the movement signal). This enables a more robust and more precise generation of the temporary image.

In a further embodiment of the method, in act f), at least one further temporary image may be generated based on the result data and the at least one initialization image. The temporary image and the at least one further temporary image may map the examination object at different instants. The different instants include the further instant and/or an instant between the initial and the further instant. In addition, act g) may also include visualizing a graphical representation of the at least one further temporary image using the presentation apparatus.

The at least one further temporary image may have all features and properties of the temporary image. For example, the at least one further temporary image may be generated analogously to the temporary image in act f) based on the result data and the at least one initialization image. In one embodiment, in act f), a plurality of further temporary images that map the examination object at different instants may be generated based on the result data and the at least one initialization image. In one embodiment, the temporary image and the at least one temporary image (e.g., the plurality of further temporary images) may map the examination object at different (e.g., equidistant) instants. Further, the graphical representations of the temporary image and the at least one further temporary image may be visualized successively (e.g., corresponding to the order of the instants of the mapping). This may enable a low-latency and flicker-free image impression.

In a further embodiment of the method, the instant, at which the temporary image maps the examination object, may lie between the initial instant and the further instant. The graphical representations may be visualized in acts c), g), and h) using the presentation apparatus in (e.g., direct) chronological order and at an interval corresponding to the respective instant of the mapping.

The at least one initialization image may map the examination object at the initial instant. Further, the temporary image may map the examination object at the instant between the initial and the further instant (e.g., the intermediate instant). In addition, the result image may map the examination object at the further instant. In one embodiment, the graphical representations of the at least one initialization image, the temporary image, and the result image may be visualized in chronological order (e.g., sequentially) by the presentation apparatus and at an interval corresponding to the respective instant of the mapping (e.g., the initial instant, the intermediate instant, and the further instant).

If in act f), at least one further temporary image is generated, the graphical representations of the at least one initialization image, the temporary image, the at least one further temporary image, and the result image may be visualized in chronological order by the presentation apparatus and at an interval corresponding to the respective instant of the mapping.

The embodiment may enable a realistic and simultaneously flicker-free image impression during visualization of the graphical representations by the presentation apparatus.

In a further embodiment of the method, the first processing function may include a first image reconstruction, a first artifact reduction, a first movement correction, and/or a first filtering of the first data and/or the further data.

The first data and the further data may include, for example, single images (e.g., projection mappings) with at least partially different acquisition geometry (e.g., projection direction). The first image reconstruction may include, for example, a filtered back projection and/or an inverse radon transformation and/or an iterative reconstruction (e.g., statistical and/or model-based) of the first data and/or the further data (e.g., of the respective projection mappings). Alternatively, the first data and the further data may have frequency data. The first image reconstruction may include an inverse Fourier transform of the first data and/or the further data.

Alternatively or in addition, the first processing function may include a first artifact reduction (e.g., a metal artifact correction) of the first data and/or the further data. In addition, the first processing function may include a first movement correction (e.g., a correction of physiological movements of the examination object, such as a respiratory movement and/or a cardiac movement) of the first and/or the further data. Further, the first processing function may include a filtering (e.g., a windowing and/or a noise filtering and/or a low-pass filtering and/or a high-pass filtering and/or an averaging over time, such as with additional use of the at least one initialization image) of the first data and/or the further data.

The first processing function may substantially process the high-contrast objects mapped in the first data and/or the further data. Further, the first processing function may filter out (e.g., mask) the low-contrast objects mapped in the first data and/or the further data. Further, the first processing function may process only some of the first data and/or the further data as input data (e.g., a spatial section of the examination object mapped in the first data and/or the further data).

This may improve an image quality of the output data of the first processing function (e.g., of the result data and/or of the at least one initialization image).

In a further embodiment of the method, the second processing function may include a second image reconstruction, a second artifact reduction, a second movement correction, and/or a second filtering of the first data and/or the further data and/or the result data.

The second processing function may, for example, have all features and properties that were described in relation to the first processing function.

In one embodiment, the second processing function may process the low- and high-contrast objects mapped in the first data and/or the further data. Further, the second processing function may process the first data and/or the further data in each case completely as input data. Further, the second processing function may be applied to the result data as input data, whereby an image quality of the result image may be improved with respect to the result data.

Am image quality of the output data of the second processing function (e.g., of the result image and/or of the at least one initialization image) may be improved hereby.

In a further embodiment of the method, the temporary image may be generated in act f) by (e.g., weighted) averaging and/or addition and/or subtraction and/or multiplication and/or interpolation of the result data and of the at least one initialization image.

The (e.g., weighted) averaging and/or addition and/or subtraction and/or multiplication and/or interpolation of the result data and of the at least one initialization image may take place image point-wise. In one embodiment, the at least one initialization image and the result data may in each case have a plurality of image points with image values that correspond spatially with each other. Further, the temporary image may have a plurality of image points with image values. The image values of the image points of the temporary image may be determined in act f) by (e.g., weighted) averaging and/or addition and/or subtraction and/or multiplication and/or interpolation of the image values of the spatially mutually corresponding image points of the at least one initialization image and of the result data. Alternatively, the (e.g., weighted) averaging and/or addition and/or subtraction and/or multiplication and/or interpolation of the result data and of the at least one initialization image may take place at least image region-wise or as a whole (e.g., image-wise).

The temporary image having portions of the at least one initialization image and the result data may be generated via the embodiment. Mapping errors of the examination object may be minimized in the temporary image hereby.

In a further embodiment of the method, the temporary image may be generated in act f) by applying a trained function to input data. The input data may be based on the at least one initialization image and the result data. Further, at least one parameter may be adjusted by a comparison of a training temporary image with a comparison temporary image.

The trained function may be trained by a machine learning method. For example, the trained function may be neural network (e.g., a convolutional neural network (CNN) or a network including a convolutional layer).

The trained function maps input data on output data. The output data may, for example, still depend on one or more parameters of the trained function. The one or more parameters of the trained function may be determined and/or adjusted by training. Determining and/or adjusting the one or more parameter(s) of the trained function may be based, for example, on a pair including training input data and associated training output data (e.g., comparison output data), with the trained function being applied to the training input data to generate training mapping data. For example, determining and/or adjusting may be based on a comparison of the training mapping data and the training output data (e.g., the comparison output data). In general, a trainable function (e.g., a function with one or more parameters yet to be adjusted) may be referred to as a trained function.

Other terms for trained function are trained mapping rule, mapping rule with trained parameters, function with trained parameters, algorithm based on artificial intelligence, and machine learning algorithm. One example of a trained function is an artificial neural network, with the edge weights of the artificial neural network corresponding to the parameters of the trained function. Instead of the term "neural network", the term "neuronal network" may also be used. For example, a trained function may also be a deep neural network or deep artificial neural network. A further example of a trained function is a "Support Vector Machine" (e.g., other machine learning algorithms may still also be used as a trained function).

The trained function may be trained, for example, by back propagation. First, training mapping data may be determined by applying the trained function to training input data. In accordance herewith, a deviation between the training mapping data and the training output data (e.g., the comparison output data) may be ascertained by applying an error function to the training mapping data and the training output data (e.g., the comparison output data). Further, at least one parameter (e.g., a weighting) of the trained function (e.g., of the neural network) may be iteratively adjusted based on a gradient of the error function with respect to the at least one parameter of the trained function. The deviation between the training mapping data and the training output data (e.g., the comparison output data) may be minimized hereby during training of the trained function.

In one embodiment, the trained function (e.g., the neural network) has an input layer and an output layer. The input layer may be configured for receiving input data. Further, the output layer may be configured for providing mapping data. The input layer and/or the output layer may respectively include a plurality of channels (e.g., neurons).

The input data of the trained function may be based on the at least one initialization image and the result data. Further, the trained function may produce the temporary image as output data.

Training result data and at least one training initialization image may be received during the course of training the trained function. The training result data and the at least one training initialization image may have all features and properties of the result data and of the at least one initialization image. The training result data and the at least one training initialization image may be received analogously to the execution of acts a) to e.1) of the proposed method. Alternatively or in addition, the training result data and/or the at least one training initialization image may be simulated. Further, a training results image may be provided analogously to act e.2). The training results image may be provided as the comparison temporary image, which maps a training examination object at an instant between the initial instant and the further instant. Alternatively, the comparison temporary image may be acquired, received, or simulated. The comparison temporary image maps the training examination object at an instant between the initial instant and the further instant. Further, the training temporary image may be provided by applying the trained function to the training result data and the at least one training initialization image.

The at least one parameter of the trained function may be adjusted by the comparison between the training temporary image and the comparison temporary image. The training temporary image and the comparison temporary image may be compared image point-wise and/or feature-wise. Image values of spatially corresponding image points and/or features (e.g., anatomical and/or geometric image features, such as high-contrast objects) of the training intermediate data sets and of the comparison data set may be compared with each other. For example, the comparison between the training intermediate data set and the comparison intermediate data set may include determining a deviation between the training intermediate data set and the comparison intermediate data set. The at least one parameter of the trained function may be adjusted such that the deviation between the training intermediate data set and the comparison data set is minimized. Adjusting the at least one parameter of the trained function may, for example, include optimizing (e.g., minimizing) a cost value of a cost function, with the cost function characterizing (e.g., quantifying) the deviation between the training intermediate data set and the comparison data set. For example, adjusting the at least one parameter of the trained function may include a regression of the cost value of the cost function.

The embodiment may enable computationally efficient provision of the intermediate dataset.

In a further embodiment of the method, act f) may include identifying a portion of the result data. The portion of the result data has a deviation with respect to a corresponding portion in the at least one initialization image. The temporary image may be generated based on the at least one initialization image and the portion of the result data.

In one embodiment, the deviation between the at least one initialization image and the result data may be identified (e.g., localized and/or segmented in order to identify the portion in the result data). Identifying the deviation between the at least one initialization image and the result data may include a, for example, image point-wise comparison (e.g., a subtraction) of the at least one initialization image and the result data. For example, the comparison may include a comparison of image values of the image points of the result data with image values (e.g., spatially) corresponding to image points of the at least one initialization image. Alternatively or in addition, identifying the deviation between the at least one initialization image and the result data may be based on object tracking (e.g., on tracking of an anatomical object and/or a geometric object and/or a medical object that is mapped in the at least one initialization image and the result data).

The portion may be, for example, a connected or an unconnected image region in the result data, which includes at least one image point (e.g., a plurality of image points) of the result data. Analogously, the corresponding portion may be, for example, a connected or an unconnected image region in the at least one initialization image, which includes at least one image point (e.g., a plurality of image points) of the at least one initialization image. The portion of the at least one initialization image corresponding to the portion of the result data may be determined by the spatial correspondence between the image points of the result data and of the at least one initialization image. In one embodiment, the portion of the result data exhibits the deviation with respect to the corresponding portion of the at least one initialization image.

The temporary image may be generated based on the at least one initialization image and the portion of the result data. The temporary image may have a further portion that corresponds (e.g., spatially) to the portion of the result data. Further, the remaining part of the temporary image (e.g., the remaining image points) that are not incorporated by the further portion may correspond (e.g., spatially) to the corresponding image points of the initialization images.

The embodiment may enable particularly computationally efficient generation of the temporary image.

In a further embodiment of the method, in act b), a first initialization image may be provided by applying the first processing function to the first data and a second initialization image by applying the second processing function to the first data. The temporary image may be generated in act f) based on the result data, the first initialization image, and the second initialization image. In addition, during repeated execution of acts d) to h), the result data may be provided as the first initialization image and the result image as the second initialization image.

In one embodiment, act f) may include a (e.g., weighted) subtraction of the first initialization image from the result data, with a differential image being provided. Further, act f) may include a (e.g., weighted) averaging and/or addition and/or multiplication and/or interpolation of the second initialization image and of the differential image. Image regions of the result data, which are unchanged with respect to the first initialization image, may be removed by subtraction of the first initialization image from the result data. Further, act f) may include filtering of the differential image, with image values of image points of the differential image being compared with a provided threshold value. In addition, images regions of the result data that change slightly, and/or noise (e.g., image noise) may also be removed hereby.

These unchanged image regions may be added from the second initialization image by the averaging and/or addition and/or multiplication and/or interpolation of the second initialization image and of the differential image with higher image quality.

The present embodiments relate, in a second aspect, to a system having a medical imaging device, a provisioning unit, and a presentation apparatus. The system is configured to carry out an embodiment of a method for generating a temporary image. The medical imaging device is configured to successively acquire the first data and the further data. Further, the provisioning unit is configured to provide the at least one initialization image by applying the first processing function and/or the second processing function to the first data. In addition, the provisioning unit is configured to provide the result data by applying the first processing function to the further data. Further, the provisioning unit is configured to provide the result image by applying the second processing function to the further data and/or the result data. Further, the provisioning unit is designed to generate the temporary image based on the result data and the at least one initialization image. The presentation apparatus is configured to successively visualize the graphical representation of the at least one initialization image, the temporary image, and the result image.

The advantages of the system substantially match the advantages of the method for providing a temporary image. Features, advantages, or alternative embodiments mentioned in this connection may likewise also be transferred to the other subject matters, and vice versa.

The medical imaging device may be configured, for example, as a magnetic resonance tomography system (MRT) and/or computed tomography system (CT) and/or medical X-ray device and/or positron emission tomography system (PET) and/or ultrasound device and/or optical imaging device.

In one embodiment, the provisioning unit may include a computing unit, a memory unit, and/or an interface. The provisioning unit may be communicatively coupled to the medical imaging device and the presentation apparatus by the interface. For example, the interface may be configured to receive the first data and the further data from the medical imaging device. Further, the computing unit and/or the memory unit may be configured to provide the at least one initialization image, the result data and/or the result image, and/or to generate the temporary image. In addition, the interface may be configured to provide (e.g., transfer) the at least one initialization image, the temporary image, and/or the result image to the presentation apparatus.

The present embodiments relate, in a third aspect, to a computer program product with a computer program that may be loaded directly into a memory of a provisioning unit, with program segments, in order to carry out all acts of the method for generating a temporary image when the program segments are executed by the provisioning unit.

The present embodiments may also relate to a computer-readable storage medium on which program segments that may be read and executed by a provisioning unit are stored in order to carry out all acts of the method for generating a temporary image when the program segments are executed by the provisioning unit.

An implementation largely in terms of software has the advantage that even previously used provisioning units and/or training units may easily be retrofitted via a software update in order to work according to the present embodiments. In addition to the computer program, a computer program product of this kind may optionally include additional component parts such as documentation and/or additional components, and hardware components, such as hardware keys (e.g., dongles, etc.) in order to use the software.

BRIEF DESCRIPTION OF THE DRAWINGS

Exemplary embodiments of the invention are represented in the drawings and will be described in more detail below. Same reference numerals will be used in different figures for same features. In the drawings.

DETAILED DESCRIPTION

Figure 1:
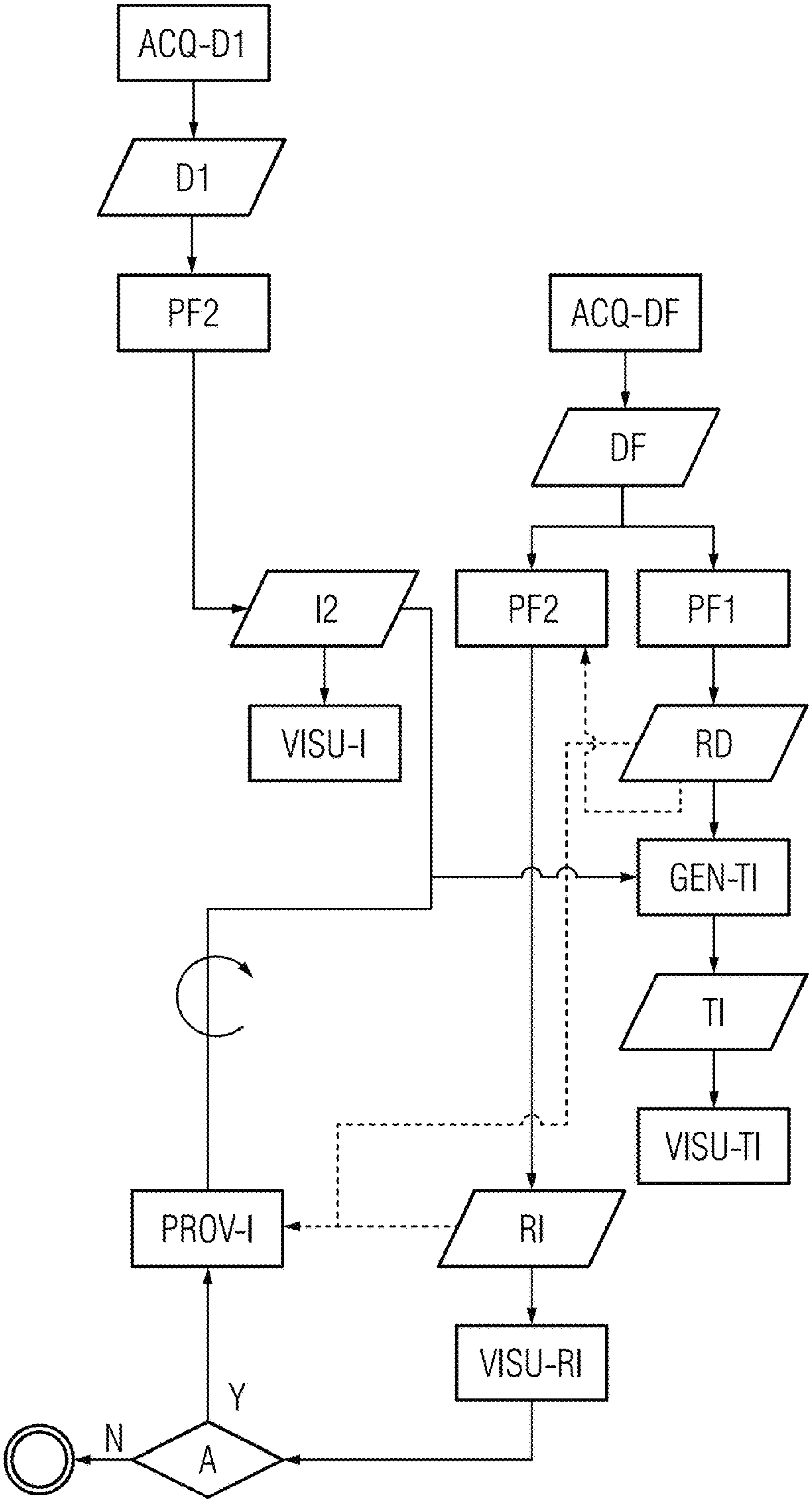
FIGS. 1 to 4 show schematic representations of different embodiments of a method for generating a temporary image.

FIG. 1 schematically represents an embodiment of a method for generating GEN-TI a temporary image TI. In a first act a), first data D1 of an examination object may be acquired ACQ-D1 by a medical imaging device. In a second act b), at least one initialization image I2 may be provided by applying a first processing function PF1 and/or a second processing function PF2 to the first data D1. FIG. 1 shows, by way of example, a provision of the at least one initialization image I2 by applying the second processing function PF2 to the first data D1. In a third act c), a graphical representation of the at least one initialization image I2 may be visualized VISU-I by a presentation apparatus. In a fourth act d), further data DF of the examination object may be acquired ACQ-DF by the medical imaging device (e.g., after the acquisition ACQ-D1 of the first data D1). The first data D1 and the further data DF may map an at least partially shared examination region of the examination object. In a fifth act e.1), result data RD may be provided by applying the first processing function PF1 to the further data DF. In a sixth act e.2), a result image RI may be provided by applying the second processing function PF2 to the further data DF and/or the result data RD. The result data RD may be provided before the result image RI. Further, in a seventh act f), a temporary image TI may be generated GEN-TI based on the result data RD and the at least one initialization image I2. In an eighth act g), a graphical representation of the temporary image TI may be visualized VISU-TI by the presentation apparatus. Further, in a ninth act h), a graphical representation of the result image RI may be visualized VISU-RI by the presentation apparatus. At least acts c), g) and h) (e.g., visualizing the graphical representations of the at least one initialization image VISU-I, the temporary image VISU-TI, and the result image VISU-RI, respectively) may be executed successively. In one embodiment, acts d) to h) may be repeated until the occurrence Y of a termination condition A. The result data RD and/or the result image RI may be provided PROV-I during the repeated execution of acts d) to h) as the at least one initialization image I2.

In one embodiment, the at least one initialization image I2 may map the examination object at an initial instant. Further, the result data RD may map the examination object at a further instant after the initial instant. In addition, the temporary image TI may be generated GEN-TI in act f) such that the temporary image TI maps the examination object at the further instant or at an instant between the initial and the further instant.

In one embodiment, in act f), at least one further temporary image may be generated based on the result data RD and the at least one initialization image I2. The temporary image TI and the at least one further temporary image may map the examination object at different instants. The different instants include the further instant and/or an instant between the initial instant and the further instant. Further, in act g), a graphical representation of the at least one further temporary image may still be visualized by the presentation apparatus.

If the temporary image TI maps the examination object at an instant between the initial instant and the further instant, the graphical representations may be visualized VISU-I, VISU-TI and VISU-RI in acts c), g) and h) by the presentation apparatus in, for example, direct, chronological order and at an interval corresponding to the respective instant of the mapping.

In one embodiment, the first processing function PF1 may include a first image reconstruction, a first artifact reduction, a first movement correction, and/or a first filtering of the first data D1 and/or the further data DF. Further, the second processing function PF2 may include a second image reconstruction, a second artifact reduction, a second movement correction, and/or a second filtering of the first data D1, the further data DF, and/or the result data RD.

Further, the temporary image TI may be generated GEN-TI in act f) by, for example, weighted, averaging and/or addition and/or subtraction and/or multiplication and/or interpolation of the result data RD and of the at least one initialization image I2.

Alternatively, the temporary image TI may be generated GEN-TI in act f) by applying a trained function to input data. The input data of the trained function may be based on the at least one initialization image I2 and the result data RD. Further, at least one parameter of the trained function may be adjusted by way of a comparison of a training temporary image with a comparison temporary image.

Figure 2:
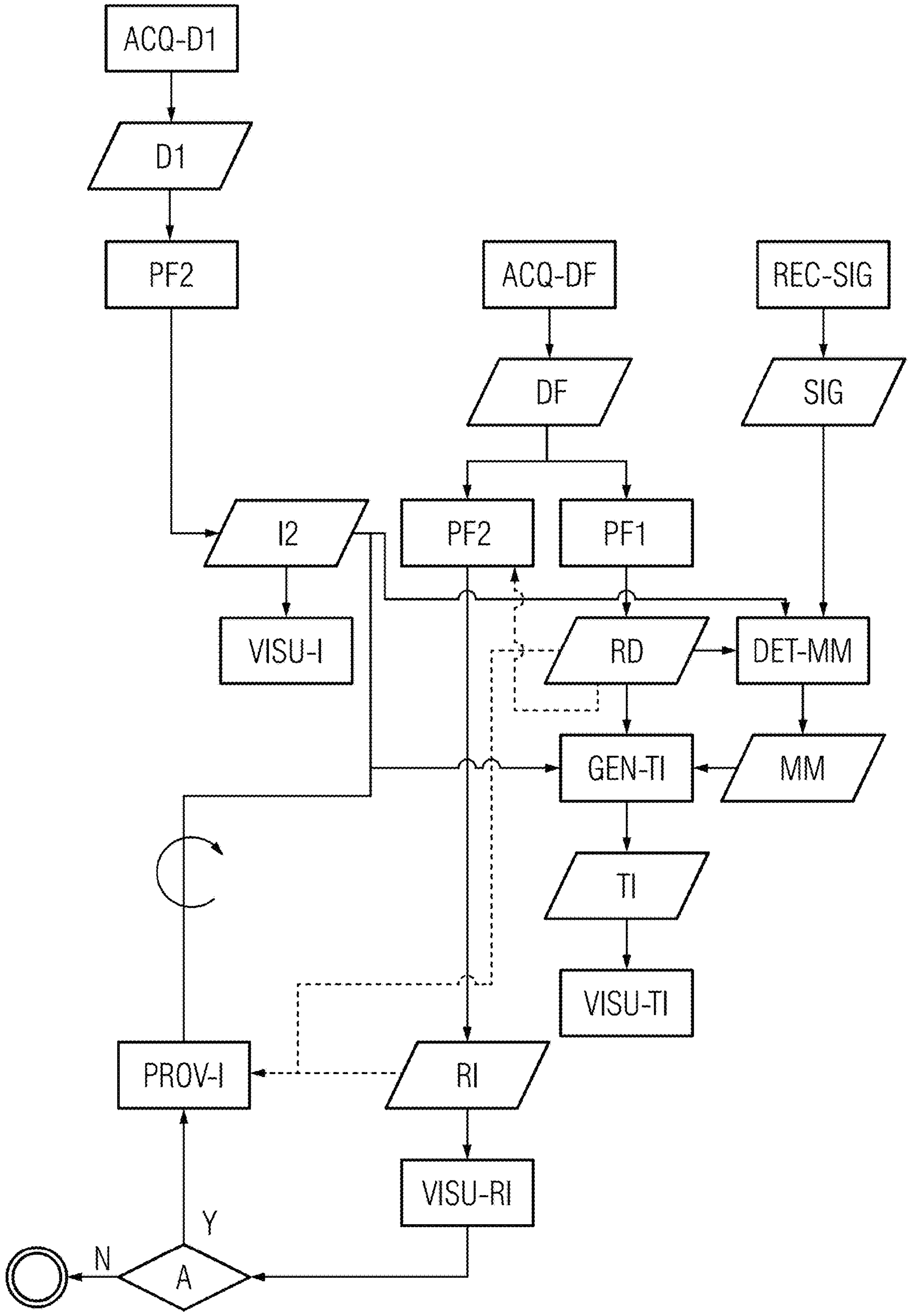

FIG. 2 shows a schematic representation of a further embodiment of a method for generating GEN-TI a temporary image TI. The result data RD may map a change in the examination object with respect to the at least one initialization image I2. In act f), a movement model MM characterizing the change may be determined DET-MM using the at least one initialization image I2 or using the at least one initialization image I2 and the result data RD. In addition, the temporary image TI may be generated GEN-TI also based on the movement model MM such that the temporary image TI maps the change at the further instant or at the instant between the initial and the further instant.

In one embodiment, acts d) to h) may be repeated at least once. The movement model MM may be determined DET- MM using the previous initialization images I2 and the respectively current result data RD.

Further, a movement signal SIG may be received REC-SIG. The movement signal SIG describes a physiological movement of the examination object and/or a movement of a medical object in the examination object. The movement model MM may also be determined DET-MM using the movement signal SIG.

Figure 3:
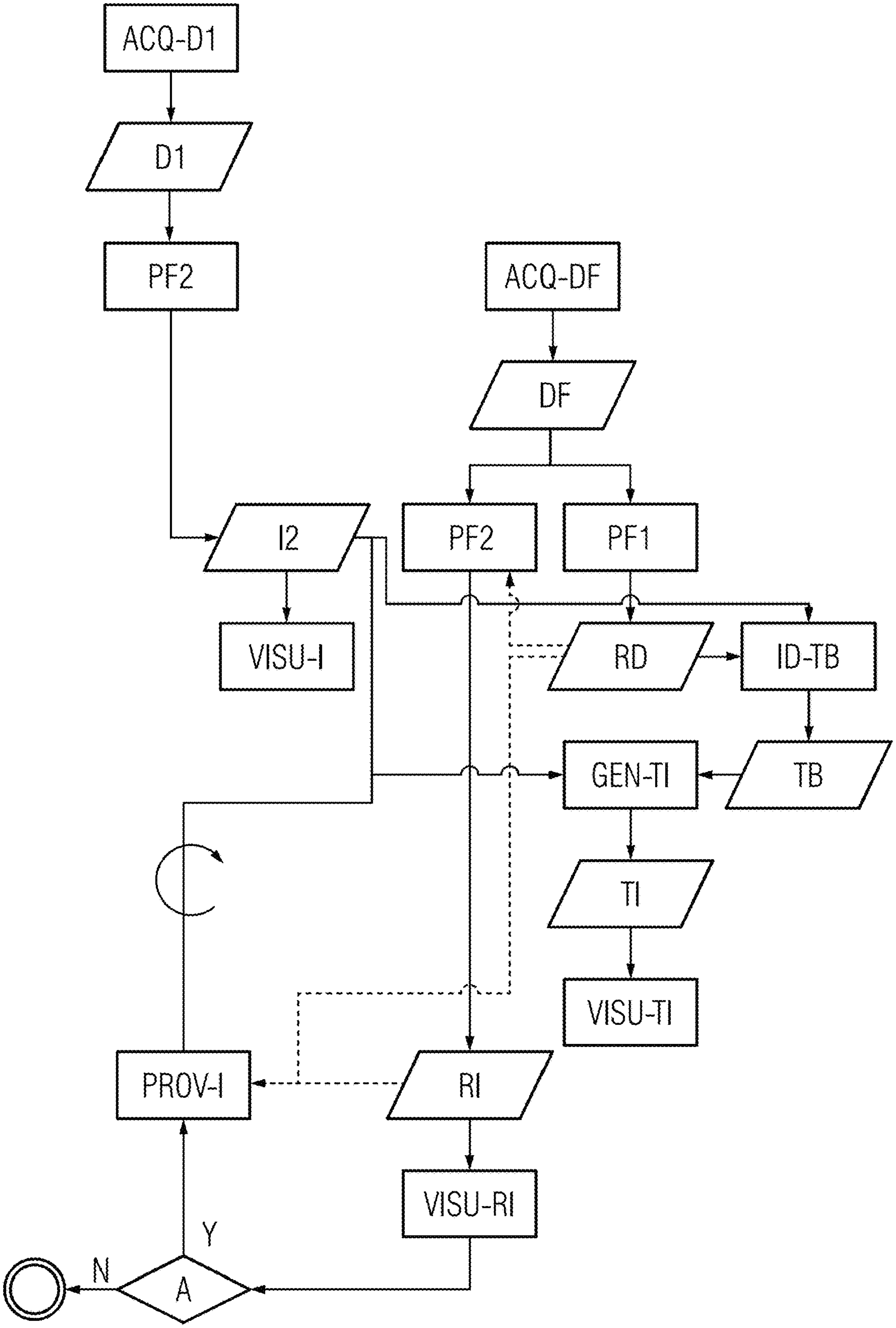

FIG. 3 schematically represents a further embodiment of a method for generating GEN-TI a temporary image TI. Act f) may include identifying ID-TB a portion TB of the result data RD. The portion TB has a deviation with respect to a corresponding portion in the at least one initialization image I2. The temporary image TI may be generated based on the at least one initialization image I2 and the portion TB of the result data RD.

Figure 4:
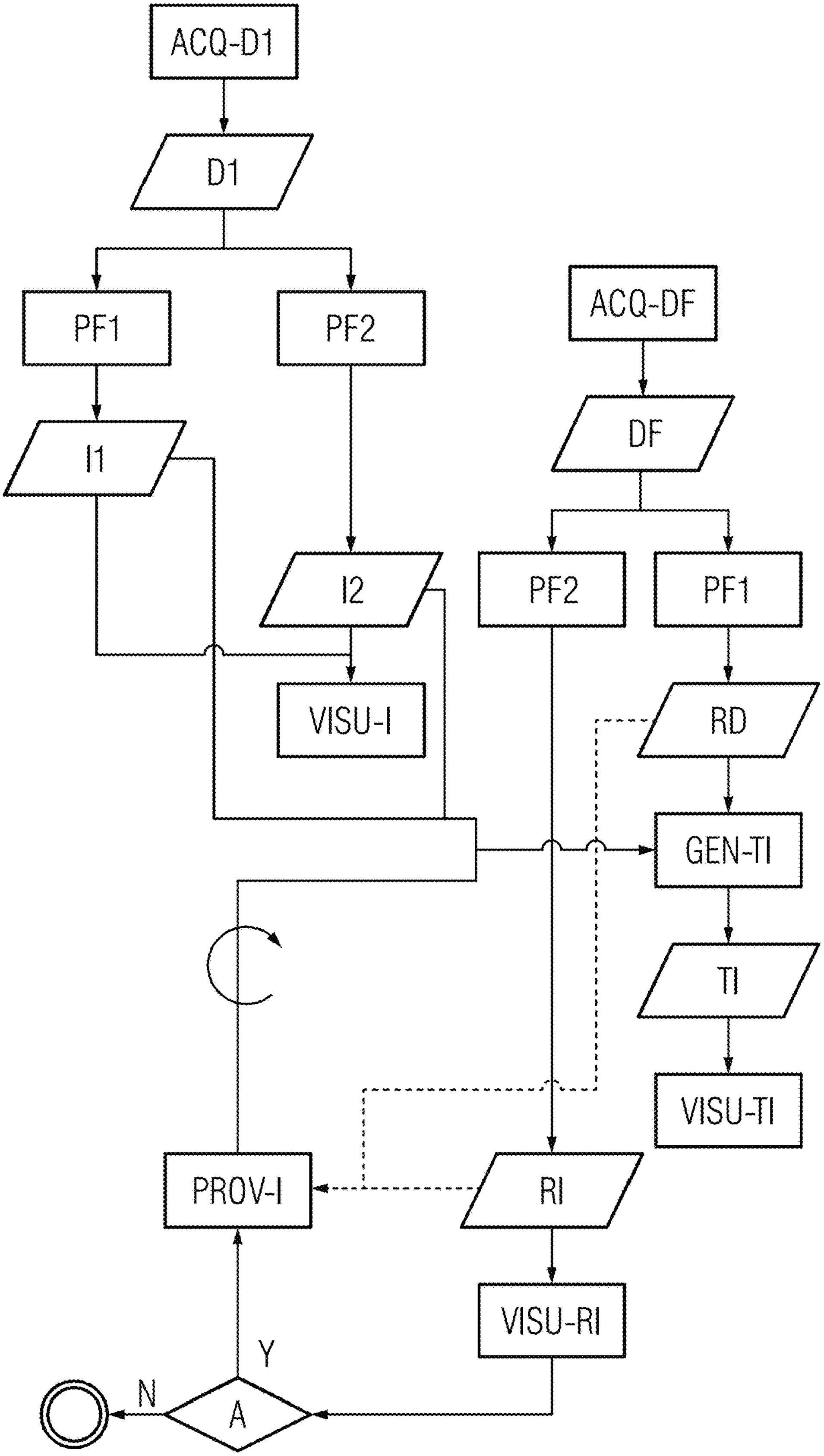

FIG. 4 shows a schematic representation of a further embodiment of a method for generating GEN-TI a temporary image TI. In act b), a first initialization image I1 may be provided by applying the first processing function PF1 to the first data D1 and a second initialization image I2 by applying the second processing function PF2 to the first data D1. Further, the temporary image TI may be generated GEN-TI in act f) based on the result data RD, the first initialization image I1, and the second initialization image I2. In addition, during the repeated execution of acts d) to h), the result data RD may be provided PROV-I as the first initialization image I1, and the result image RI may be provided as the second initialization image I2.

In one embodiment, act f) may include (e.g., weighted) subtraction of the first initialization image I1 from the result data RD, with a differential image being provided. Further, act f) may include (e.g., weighted) addition of the second initialization image I2 and of the differential image. Image regions of the result data RD that are unchanged with respect to the first initialization image I1 may be removed by the subtraction of the first initialization image I1 from the result data RD. The constant image portions with a higher image quality may be added from the second initialization image I2 to the temporary image TI by the addition of the second initialization image I2 and the differential image:

$$TI=I_2-\alpha\cdot I_1+\beta\cdot RD \quad (1),$$

where $\alpha$, $\beta\in[0, 1]$ (e.g., $\alpha=\beta=0.5$) are weighting factors for the addition and subtraction.

Figure 5:
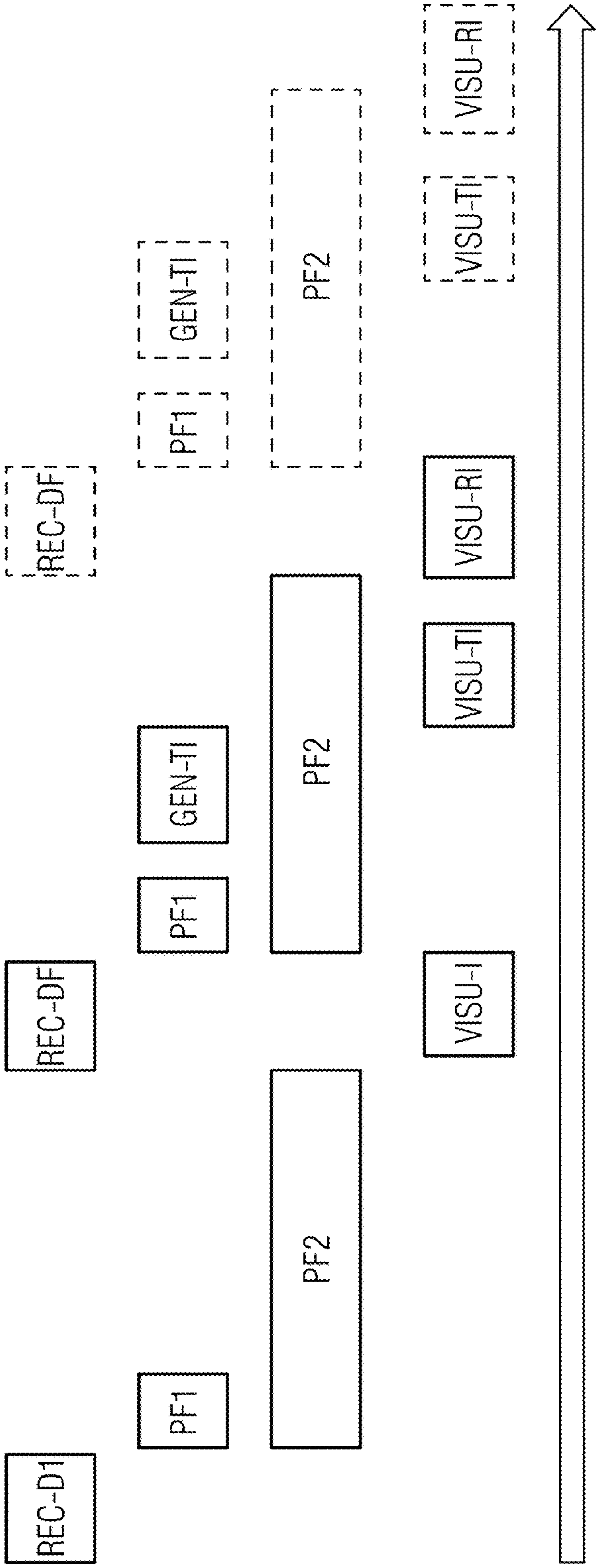
FIG. 5 shows a schematic representation of a progression over time of an embodiment of a method for generating a temporary image.

FIG. 5 shows a schematic representation of a progression over time of an embodiment of the method for generating GEN-TI a temporary image TI. The time dimension is illustrated by a horizontal arrow in FIG. 5. Further, the result data RD may be provided by applying the first processing function PF1 to the further data DF in a first provisioning duration. The first provisioning duration is shorter than a second provisioning duration of the second processing function PF2 for providing the result image RI.

With an exemplary acquisition rate of the first data D1 and the further data DF of 30 frames per second (fps), a time difference (e.g., a frame duration) between the initial instant and the further instant is approximately 33.3 ms. If at 23.3 ms, for example, the first provisioning duration of the first processing function PF1 is faster, for example, by half a frame duration (e.g., 16.7 ms) than the second provisioning duration, which is, for example, 40 ms, the visualization VISU-TI of the graphical representation of the temporary image TI may take place as early as before providing the result image RI. If the temporary image TI and the result image RI map the examination object respectively at the further instant, the latency between the acquisition ACQ-DF of the further data DF and the visualization of a graphical representation of a mapping of the examination object at the further instant may be reduced by the visualization VISU-TI of the graphical representation of the temporary image TI.

Figure 6:
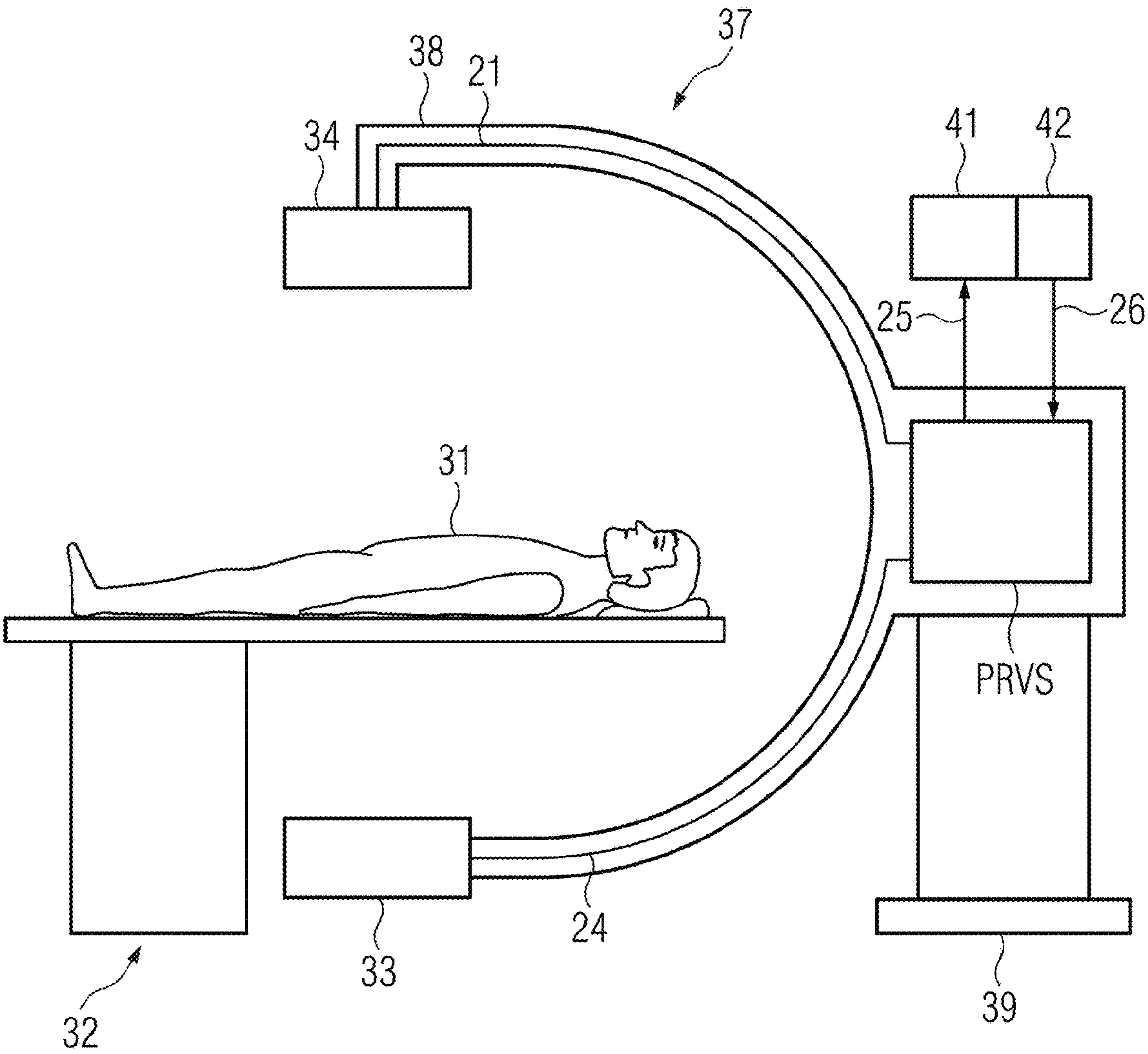
FIG. 6 shows a schematic representation of an embodiment of a system.

FIG. 6 shows a schematic representation of an embodiment of a system. The system may have a medical imaging device, a provisioning unit PRVS, and a presentation apparatus 41. The system may be configured to carry out an embodiment of the method for generating GEN-TI a temporary image TI.

FIG. 6 schematically represents, by way of example for a medical imaging device, a medical C-arm X-ray device 37. The medical C-arm X-ray device 37 may include a detector 34 (e.g., an X-ray detector) and an X-ray source 33. An arm 38 of the C-arm X-ray device 37 may be positioned to move around one or more axes in order to acquire the first data D1 and the further image data DF. Further, the medical C-arm X-ray device 37 may include a movement apparatus 39 that enables a movement of the C-arm X-ray device 37 in the space. The medical C-arm X-ray device 37 may be configured to successively acquire ACQ-D1 and ACQ-DF the first data D1 and the further data DF.

The provisioning unit PRVS may send a signal 24 to the X-ray source 33 in order to acquire the first data ACQ-D1 and the further image data ACQ-DF from the examination object 31, arranged on a patient-positioning facility 32. The X-ray source 33 may then emit an X-ray beam bundle. When the X-ray beam bundle, after interaction with the examination object 31, impinges on a surface of the detector 34, the detector 34 may send a signal 21 to the provisioning unit PRVS. The provisioning unit PRVS may receive the first data D1 and/or the further data DF using the signal 21, for example.

Further, the system may have an input unit 42 (e.g., a keyboard) and the presentation apparatus 41 (e.g., a monitor and/or display and/or projector). The input unit 42 may be integrated in the presentation apparatus 41 (e.g., in the case of a capacitive and/or resistive input display). An input of the user at the input unit 42 may enable control of the medical C-arm X-ray device 37 (e.g., of the method for generating GEN-TI a temporary image TI). For this, the input unit 42 may send, for example, a signal 26 to the provisioning unit PRVS.

The provisioning unit PRVS may be configured to provide the at least one initialization image I1 and/or I2 by applying the first processing function PF1 and/or the second processing function PF1 to the first data D1. In addition, the provisioning unit PRVS may be configured to provide the result data RD by applying the first processing function PF1 to the further data DF. Further, the provisioning unit PRVS may be configured to provide the result image RI by applying the second processing function PF2 to the further data DF and/or the result data RD. Further, the provisioning unit PRVS may be configured to generate GEN-TI the temporary image TI based on the result data RD and the at least one initialization image I2. The presentation apparatus 41 may be configured to successively visualize VISU-I, VISU-TI and VISU-RI the graphical representation of the at least one initialization image I2, the temporary image TI, and the result image RI. For this, the provisioning unit PRVS may provide the presentation apparatus 41 with the at least one initialization image I2, the temporary image TI, and the result image RI using a signal 25.

The schematic representations contained in the described figures do not in any way depict a scale or size ratio.

In conclusion, reference will be made once again to the fact that the methods and apparatuses described in detail above are merely exemplary embodiments that may be modified in a wide variety of ways by a person skilled in the art without departing from the scope of the invention. Further, use of the indefinite article "a" or "an" does not preclude the relevant features from also being present several times. Similarly, the terms "unit" and "element" do not preclude the relevant components from being composed of a plurality of interacting sub-components that may optionally also be spatially distributed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating a temporary image, the method comprising:

acquiring first data of an examination object using a medical imaging device, the first data mapping the examination object at a first timepoint;

providing at least one initialization image, the providing of the at least one initialization image comprising applying a first processing function, a second processing function, or the first processing function and the second processing function to the first data, wherein the first processing function and the second processing function are at least partially different;

visualizing, by a presentation apparatus, a graphical representation of the at least one initialization image;

acquiring further data of the examination object using the medical imaging device, the further data mapping the examination object at a second timepoint, the second timepoint being after the first timepoint;

providing result data, the providing of the result data comprising applying the first processing function to the further data;

providing a result image, the providing of the result image comprising applying the second processing function to the further data, the result data, or the further data and the result data, wherein the result data is provided before the result image;

generating the temporary image based on the result data and the at least one initialization image, the generating of the temporary image being before the providing of the result image;

visualizing, by the presentation apparatus, a graphical representation of the temporary image;

visualizing, by the presentation apparatus, a graphical representation of the result image;

wherein the visualizing of the graphical representation of the at least one initialization image, the visualizing of the graphical representation of the temporary image, and the visualizing of the graphical representation of the result image are successively executed, wherein the acquiring of the further data, the providing of the result data, the providing of the result image, the generating of the temporary image, the visualizing of the graphical representation of the temporary image, and the visualizing of the graphical representation of the result image are executed repeatedly until occurrence of a termination condition, wherein the result data, the result image, or the result data and the result image are provided as the at least one initialization image during the repeated execution, and wherein generating the temporary image comprises averaging, addition, subtraction, multiplication, interpolation, or any combination thereof of the result data and of the at least one initialization image.

2. The method of claim 1, wherein providing the result data comprises applying the first processing function to the further data in a first provisioning duration, the first provisioning duration being shorter than a second provisioning duration of the second processing function for providing the result image.

3. The method of claim 1, wherein the at least one initialization image maps the examination object at an initial instant, wherein the result data maps the examination object at a further instant after the initial instant, and wherein the temporary image is generated such that the temporary image maps the examination object at the further instant or at an instant between the initial instant and the further instant.

4. The method of claim 3, wherein the result data maps a change in the examination object with respect to the at least one initialization image, wherein generating the temporary image comprises determining a movement model characterizing the change using the at least one initialization image or using the at least one initialization image and the result data, and wherein the temporary image is generated also based on the movement model such that the temporary image maps the change at the further instant or at the instant between the initial instant and the further instant.

5. The method of claim 4, wherein the acquiring of the further data, the providing of the result data, the providing of the result image, the generating of the temporary image, the visualizing of the graphical representation of the temporary image, and the visualizing of the graphical representation of the result image are repeated at least once, and wherein determining the movement model comprises determining the movement model using previous initialization images and the respectively current result data.

6. The method of claim 4, further comprising receiving a movement signal that describes a physiological movement of the examination object, a movement of a medical object in the examination object, or the physiological movement of the examination object and the movement of a medical object in the examination object, and wherein the movement model is also determined using the movement signal.

7. The method of claim 3, wherein the generating of the temporary image comprises generating at least one further temporary image based on the result data and the at least one initialization image, wherein the temporary image and the at least one further temporary image maps the examination object at different instants, the different instants comprising the further instant, the instant between the initial instant and the further instant, or the further instant and the instant between the initial instant and the further instant, and wherein visualizing the graphical representation of the temporary image also comprises visualizing, by the presentation apparatus, a graphical representation of the at least one further temporary image.

8. The method of claim 3, wherein the instant at which the temporary image maps the examination object lies between the initial instant and the further instant, and wherein the graphical representations are successively displayed by the presentation apparatus and at an interval corresponding to the respective instant of the mapping.

9. The method of claim 1, wherein the first processing function comprises a first image reconstruction, a first artifact reduction, a first movement correction, a first filtering of the first data, the further data, or the first data and the further data, or any combination thereof.

10. The method of claim 1, wherein the second processing function comprises:

a second image reconstruction;

a second artifact reduction;

a second movement correction;

a second filtering of the first data, the further data, the result data, or any combination thereof; or any combination thereof.

11. The method of claim 1, wherein generating the temporary image comprises applying a trained function to input data, wherein the input data is based on the at least one initialization image and the result data, and wherein at least one parameter of the trained function is adjusted by a comparison of a training temporary image with a comparison temporary image.

12. The method of claim 1, wherein generating the temporary image comprises identifying a portion of the result data, the portion having a deviation with respect to a corresponding portion in the at least one initialization image, wherein generating the temporary image comprises generating the temporary image based on the at least one initialization image and the portion of the result data.

13. The method of claim 1, wherein providing the at least one initialization image comprises:

providing a first initialization image, the providing of the first initialization image comprising applying the first processing function to the first data; and providing a second initialization image, the providing of the second initialization image comprising applying the second processing function to the first data (D1), wherein the temporary image is generated based on the result data, the first initialization image, and the second initialization image, and wherein during the repeated execution, the result data is provided as the first initialization image and the result image is provided as the second initialization image.

14. The method of claim 1, wherein each of the at least one initialization image and the result data has a plurality of image points with image values that correspond spatially with each other.

15. The method of claim 1, wherein applying the second processing function to the further data, the result data, or the further data and the result data comprises applying the second processing function to the result data as input data, such that an image quality of the result image is better than an image quality of the result data.

16. A system comprising:

a medical imaging device configured to acquire first data and further data, the first data mapping an examination object at a first timepoint and the further data mapping the examination object at a second timepoint, the second timepoint being after the first timepoint;

a provisioning unit configured to:

provide at least one initialization image, the provision of the at least one initialization image comprising application of a first processing function, a second processing function, or the first processing function and the second processing function to the first data;

provide result data, the provision of the result data comprising application of the first processing function to the further data;

provide a result image, the provision of the result image comprising application of the second processing function to the further data, the result data, or the further data and the result data;

generate a temporary image based on the result data and the at least one initialization image, the generation of the temporary image being before the provision of the result image; and a presentation apparatus configured to successively visualize graphical representations of the at least one initialization image, the temporary image, and the result image, respectively, wherein the generation of the temporary image comprises averaging, addition, subtraction, multiplication, interpolation, or any combination thereof of the result data and of the at least one initialization image.

17. In a non-transitory computer-readable storage medium that stores instructions executable by one or more processors to generate a temporary image, the instructions comprising:

acquiring first data of an examination object using a medical imaging device, the first data mapping the examination object at a first timepoint;

providing at least one initialization image, the providing of the at least one initialization image comprising applying a first processing function, a second processing function, or the first processing function and the second processing function to the first data, wherein the first processing function and the second processing function are at least partially different;

visualizing, by a presentation apparatus, a graphical representation of the at least one initialization image;

acquiring further data of the examination object using the medical imaging device, the further data mapping the examination object at a second timepoint, the second timepoint being after the first timepoint;

providing result data, the providing of the result data comprising applying the first processing function to the further data;

providing a result image, the providing of the result image comprising applying the second processing function to the further data, the result data, or the further data and the result data, wherein the result data is provided before the result image;

generating the temporary image based on the result data and the at least one initialization image, the generating of the temporary image being before the providing of the result image;

visualizing, by the presentation apparatus, a graphical representation of the temporary image;

visualizing, by the presentation apparatus, a graphical representation of the result image;

wherein the visualizing of the graphical representation of the at least one initialization image, the visualizing of the graphical representation of the temporary image, and the visualizing of the graphical representation of the result image are successively executed, wherein the acquiring of the further data, the providing of the result data, the providing of the result image, the generating of the temporary image, the visualizing of the graphical representation of the temporary image, and the visualizing of the graphical representation of the result image are executed repeatedly until occurrence of a termination condition, wherein the result data, the result image, or the result data and the result image are provided as the at least one initialization image during the repeated execution, and wherein generating the temporary image comprises averaging, addition, subtraction, multiplication, interpolation, or any combination thereof of the result data and of the at least one initialization image.

18. The non-transitory computer-readable storage medium of claim 17, wherein providing the result data comprises applying the first processing function to the further data in a first provisioning duration, the first provisioning duration being shorter than a second provisioning duration of the second processing function for providing the result image.

19. The non-transitory computer-readable storage medium of claim 17, wherein the at least one initialization image maps the examination object at an initial instant, wherein the result data maps the examination object at a further instant after the initial instant, and wherein the temporary image is generated such that the temporary image maps the examination object at the further instant or at an instant between the initial instant and the further instant.

* * * * *